United States Patent [19]
Schubert

[11] 4,283,900
[45] Aug. 18, 1981

[54] CORNER BRACE FOR BUILDING CONSTRUCTION

[76] Inventor: Donald R. Schubert, Rte. 1, Box 124, Adkins, Tex. 78101

[21] Appl. No.: 26,423

[22] Filed: Apr. 2, 1979

[51] Int. Cl.³ .............................................. E04B 1/38
[52] U.S. Cl. ...................................... 52/712; 52/656; 403/402
[58] Field of Search ................. 52/656, 712, 721, 715, 52/94, 288, 58; 403/402, 406

[56] References Cited

U.S. PATENT DOCUMENTS

| | | | |
|---|---|---|---|
| 528,679 | 11/1894 | McGahey | 403/402 |
| 3,414,300 | 12/1968 | Spane | 403/402 X |
| 3,958,284 | 5/1976 | Jureit et al. | 403/406 X |
| 4,186,531 | 2/1980 | Okolischan | 52/95 X |

FOREIGN PATENT DOCUMENTS 175797  3/1922  United Kingdom ..................... 403/402

*Primary Examiner*—Carl D. Friedman
*Attorney, Agent, or Firm*—Darryl M. Springs

[57] ABSTRACT

In one exemplar embodiment, a corner brace for joining a barge rafter and fascia board in building construction is provided that comprises a right-angularly shaped metal channel having a base and two pairs of spaced parallel ascending sides for receiving and supporting the adjacent respective ends of a right-angularly disposed barge rafter and fascia board. The outer right-angularly disposed ascending sides of the metal channel form face plates for contacting a substantial portion of the outer surface of the ends of the barge rafter and fascia board and have a plurality of spaced apertures disposed therein for accommodating conventional fastening means such as nails or screws. The inner pair of the right-angularly disposed ascending sides comprise flanges for contacting a portion of the inner surface of the ends of the barge rafter and fascia board for retaining the end of the barge rafter in a right-angular relationship with the end of the fascia board between the respective spaced pairs of the flanges and face plates in a rigid relationship.

7 Claims, 4 Drawing Figures

CORNER BRACE FOR BUILDING CONSTRUCTION

BACKGROUND OF THE INVENTION

This invention relates to building construction and particularly to that portion of building construction that utilize standard timbers in building construction, particularly residential building construction. More particularly, the invention pertains to a corner brace for joining the ends of a barge rafter and facet or fascia board, whether the joint is a mitered or butt joint.

In building construction, particularly residential construction, the joint between the barge rafter and the facet or fascia board has long presented problems. In a 90° butt joint, one end of either the barge rafter or fascia board is totally exposed, making an unsightly joint, that if not carefully measured and cut, is difficult to match. The common solution to the problem is a mitered 45° joint, which is attractive and leaves no totally exposed board end.

However, achieving a mitered 45° joint requires careful and skillful cutting and mitering. If the boards or timbers are warped, or the angle slightly off, the fit of the mitered joint is unacceptable.

Further, even if a mitered joint or a butt joint is caulked to close a gap, as the lumber ages and weathers it shrinks and warps, breaking the seal with the caulking and must be repaired and recaulked.

The prior art has presented no acceptable means of either repairing such defective corner connections, or of remedying the problem when the building was constructed. Structural connections such as are disclosed in U.S. Pat. No. 3,414,300 are utilized to construct in a building truss an eave elbow or the crown joint in a roof structure, and is not suitable for use as a corner brace for connecting a barge rafter with a fascia board. Similarly, other corner connectors such as those disclosed in U.S. Pat. Nos. 528,679, 1,334,553, 1,352,335, and 3,305,252, generally disclose various corner connectors for use in making picture frames, or window frames and thus are not designed to carry the loads encountered in building construction.

Further, patents such as the '679 and '553 patents mentioned above must have slots cut into the ends of the timbers to be joined as a corner, which is unnecessary in building construction, would tend to weaken the construction joint, and would in addition be costly because it would involve additional labor to cut such a joint, not to mention the problems of aligning such slots because they would have to be cut by hand by the workmen.

In addition, a fastening bracket such as that disclosed in the '335 patent mentioned above, while it could carry the construction loads demanded in the joining of a barge rafter and fascia board, its design requires that the means for fastening the bracket to the mitered ends of the timbers penetrate the timbers in both a horizontal and a vertical direction, which would be complicated or in some cases impossible to do in building construction when joining a barge rafter and fascia board.

The corner connector disclosed in the '252 patent mentioned above, utilizes a series of spikes or teeth that can be driven into the corner timbers, and while suitable for such small non-load bearing construction such as picture frames and window frames, could not withstand the warpage and other load bearing stresses of a barge rafter and fascia board in building construction. In addition, because the connector would not be permanently and securely fastened to both of the ends of the rafter and board, it would not provide a joint more rigid than directly joining the two ends of the timbers together.

A corner bracket such as the one disclosed in U.S. Pat. No. 3,854,268 would not conceal the abutting ends of the rafter and fascia board and would not provide sufficient rigidity to such a corner construction. The corner brace disclosed in U.S. Pat. No. 4,024,691 is utilized as a reinforcement brace for strengthening the joint between the bevelled ends of abutting tubular metal members such as are commonly found in the frames of metalic storm or screen doors. The disclosed brace is especially designed to be slip-fitted within each of the adjacent, abutting frame members to which the tubular frames members may then be attached. Such a disclosed corner brace, however, is not suitable for rigidly holding abutting ends of a pair of large timbers such as a rafter and fascia board rigidly together in a tight abutting relationship.

Accordingly, one primary feature of the present invention is to provide a corner brace that will rigidly accommodate and support the abutting ends of a barge rafter and fascia board and hold them in rigid alignment.

Another feature of the present invention is to provide a corner brace that can be quickly and easily attached to a barge rafter and fascia board that will eliminate time consuming special fitting of the abutting ends of the two timbers.

Yet another feature of the present invention is to provide a corner brace that is sized to fit the timbers comprising a barge rafter and fascia board that will conceal the joint of the two timbers.

Still another feature of the present invention is to provide a corner brace for joining a barge rafter and fascia that fits snugly to the boards and is unobtrusive and can readily be painted to match the building construction trim.

SUMMARY OF THE INVENTION

The present invention remedies the problems of the prior art by providing a corner brace for joining a barge rafter and a facet or fascia board in building construction, particularly residential construction, that comprises a right-angularly shaped metal channel having a base and two pairs of spaced parallel ascending sides for receiving and supporting the adjacent respective ends of a right-angularly disposed barge rafter and fascia board. The two pairs of spaced parallel ascending sides further comprise a pair of right-angularly disposed face plates ascending from the outer edge of the channel base for contacting a substantial portion of the outer surface of the ends of the barge rafter and fascia board, the abutting edges of the right-angularly disposed face plates being joined to form a corner angle for providing strength and rigidity. The face plates also have a disposed therein a plurality of spaces apertures for receiving conventional fastening means such as nails or screws.

A pair of right-angularly disposed flanges ascending from the inside edge of the channel base contact a portion of the inner surface of the ends of the barge rafter and fascia board for retaining the end of the rafter in a right-angular relationship with the end of the fascia board between the respective spaced pairs of the flanges and face plates.

BRIEF DESCRIPTION OF THE DRAWINGS

In order that the manner in which the above-recited advantages and features of the invention are obtained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings.

DETAILED DESCRIPTION OF THE PREFERRED EMBODIMENTS

The joint between the barge rafter and the facet or fascia board in building construction has long created a problem. A 90° butt joint, if not carefully measured and cut, is difficult to match to make a neat closed joint. A common solution to this problem is a mitered 45° joint, which is attractive and leaves no totally exposed board end as does the 90° butt joint. However, achieving a good mitered 45° joint requires careful and skillful cutting and mitering, and if the board is warped, or the cut angles slightly off, the fit of the mitered joint is unsightly and generally unacceptable.

Further, even if a mitered joint or butt joint is caulked to close the gap, as the lumber ages and weathers the timbers shrink and warp, breaking the seal with the caulking, and must be repaired and recaulked. However, the corner brace invention disclosed herein remedies the problems of the prior art.

Figure 1:
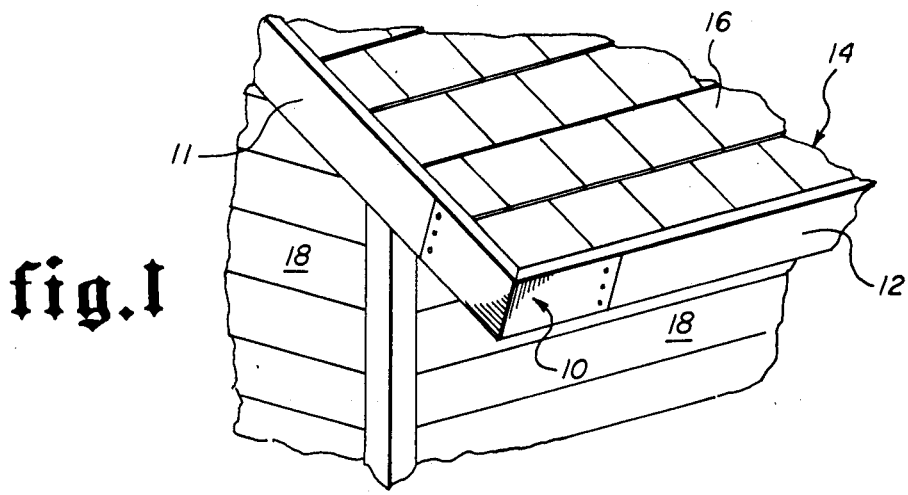
FIG. 1 is a fragmentary pictorial drawing of a portion of a building showing a typical arrangement of a barge rafter and fascia board joined in the construction of a roof with the invention in place as a corner brace.

Referring now to FIG. 1, the corner brace 10 has been designed to solve the problem of the exposed joint between a barge rafter 11 and a facet or fasica board 12 in construction of a building 14. The corner brace 10 is shown attached to the joint of a barge rafter 11 and fascia board 12 supporting a roof 16 of building 14 having sides or siding 18.

Figure 2:
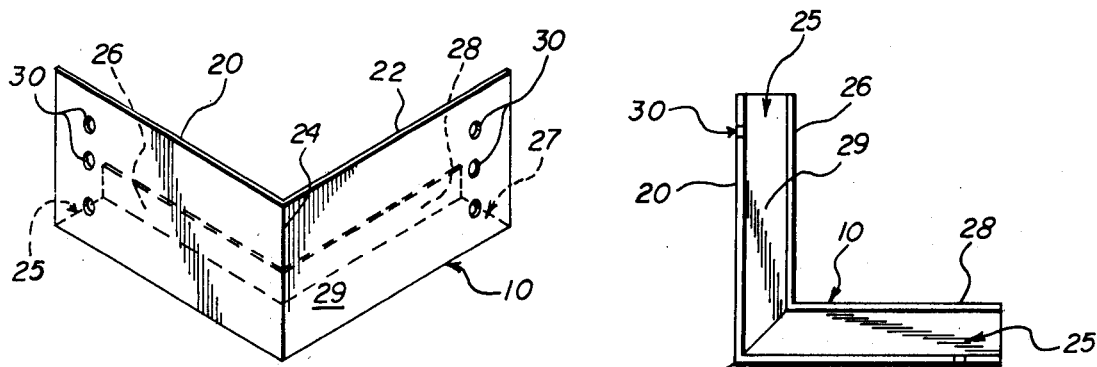
FIG. 2 is a perspective view of the corner brace.
Figure 3:
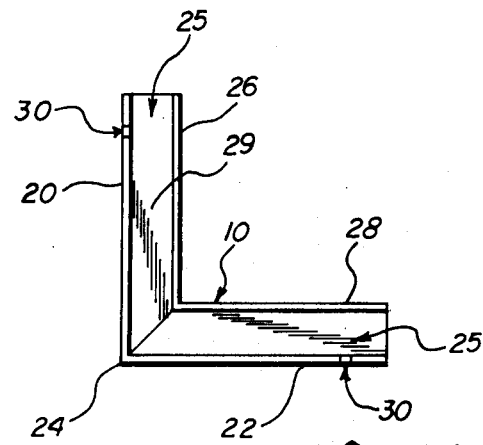
FIG. 3 is a top view of the right-angular corner brace.
Figure 4:
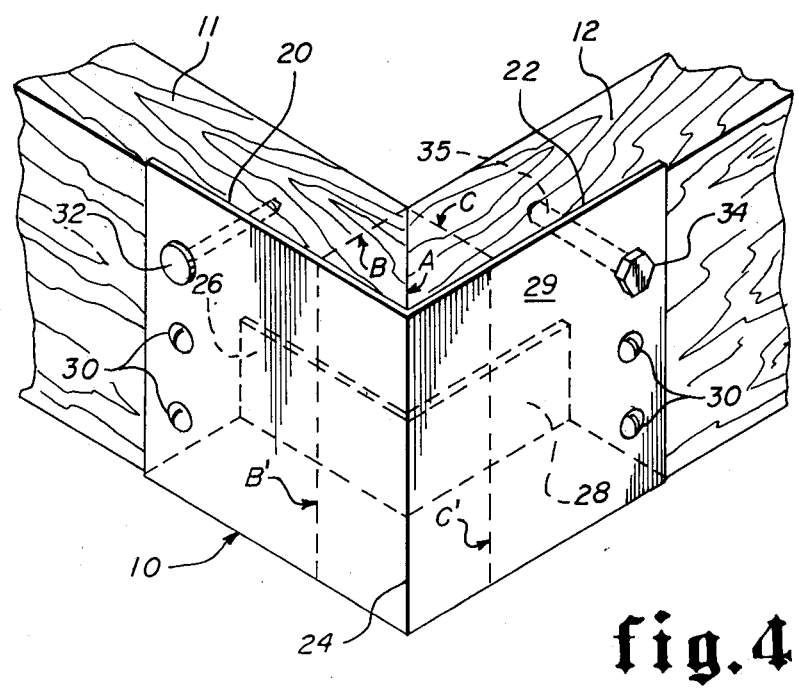
FIG. 4 is a perspective view of the corner brace illustrating various means for attaching the corner brace to the timbers and various joints of the barge rafter and fascia board.

In FIGS. 2, 3 and 4, the rigid corner brace 10 is shown in greater detail, as is the technique of attaching the corner brace to a barge rafter 11 and fascia board 12. The corner brace 10 is shown preferably constructed of a material such as galvanized sheet metal and having a pair channel members 25, 27 intersecting at a 90° angle. Channel portion 25 comprises an upright face plate 20 ascending from the outer edge of channel base 29 which is spaced from and parallel to a flange 26 ascending from the inner edge of the channel base 29.

Similarly, channel portion 27 comprises a base 29 and a face plate 22 ascending from the outer edge of base 29 and spaced from and parallel to a flange 28 ascending from the inter edge of channel base 29. The abutting ends of the rightangularly disposed face plates 20 and 22 are joined together to form a rigid corner 24 that adds strength and rigidity to the brace. The bi-planar right-angularly disposed channel portions 25 and 27 and their respective ascending face plates and flanges 20, 26 and 22, 28, respectively, form a pair of right-angularly disposed channels for receiving and supporting the adjacent respective ends of the bi-planar right-angularly disposed barge rafter 11 and fascia board 12, as can be more readily seen in FIG. 4. A plurality of spaced apertures 30 are disposed in face plates 20 and 22 to provide openings for mounting or fastening means such as nails or screws to cooperate with the corner brace 10 for permanent attachment to the barge rafter 11 and fascia plate 12.

Referring more particularly FIG. 4, a corner brace 10 is shown fastened to a barge rafter 11 and a fascia board 12 in a typical joint construction. If the barge rafter 11 and fascia board 12 have a 45° mitered joint, the abutting ends of the two timbers will form the mitered joint as shown at A. However, the corner brace 10 will accommodate differing types of butt joints, for example, the end of barge rafter 11 abutting the end of fascia board 12 and extending thereby along lines C–C', or the end of the fascia board 12 abutting the end of barge rafter 11 and extending thereby along lines B–B'. In addition, the end of barge rafter 11 and fascia board 12 may be cut and positioned such that they do not overlap one over the other, but the end of barge rafter 11 might end along lines B–B' and the end of fascia board 12 might end along lines C–C'. Accordingly, it can be seen that the corner brace 10 can accommodate several varying techniques for joining a barge rafter 11 and fascia board 12.

The corner brace 10 is permanently attached to the barge rafter 11 and fascia board 12 by means of any conventional fastening means, such as nails 32 driven through aperture 30 or screws 35 (having a head 34) driven through aperatures 30 and penetrating the ends of rafter 11 and board 12 for securely joining the corner brace 10 and the abutting ends of the timbers.

The preferred embodiment of the corner brace 10 is constructed of galvanized sheet metal which can be painted to match the exterior paint trim of the building, and will withstand weathering and rusting resist corrosion. Of course, the corner brace 10 could be constructed of any other suitable rigid, load-bearing material other than sheet metal, if it also has the other suitable characteristics such as being able to be painted and will be weather and corosion resistant to the elements.

The width of the base 29 of channel portions 25 and 27 would by necessity be sized to snugly accommodate the narrower width of a respective barge rafter 11 and fascia board 12, which is typically a nominal 2 inch size. The heighth of the face plates 20 and 22 would be sized such that they would contact a substantial portion of the face of the larger width of the timbers used for barge rafter 11 and fascia board 12 and be sized to accommodate most common sizes of rafters and boards, such as 2"×4", 2"×6" and 2"×8" sizes or any other timber sizes used in such construction. The height of flanges 26 and 28 are not critical, but should be of sufficient height for contacting a portion of the inner surface of the ends of barge rafter 11 and fascia board 12 for retaining those ends in a right-angular relationship between the respective spaced pairs of flanges and face plates 20, 26 and 22, 28 respectively.

When corner brace 10 is securely fastened to the ends of a barge rafter 11 and fascia board 12, the corner brace covers and protects the joint and hides any crack or misalignment made during construction, or that may develop later after the timbers have weathered and warped. In addition, the corner brace, retaining the ends of barge rafter 11 and fascia board 12 between the respective pairs of flanges and face plates 20, 26 and 22, 28 provides excellent structural strength and rigidity to the corner joint and actually enhances the strength of the corner joint.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. A structural corner connection, comprising
   an elongated barge rafter,
   an elongated facia board the longitudinal axis of which is perpendicular to the longitudinal axis of said barge rafter, one end of said facia board abutting one end of said barge rafter,
   a pair of metal channels each having a base and a pair of spaced parallel ascending side plates joined perpendicularly to form a right-angled corner brace having a straight rigid corner, one of said channels adapted for receiving and supporting said one end of said barge rafter in a first planar position, the other of said channels adapted for receiving and supporting said one end of said facia board in an abutting rigid right-angular relationship to said barge rafter in a second planar position perpendicular to said first planar position, the outer side plates of said corner brace channels ascending from said channel bases for contacting and covering substantially all of the outer planar surfaces of said barge rafter and facia board to protect the rafter and board surfaces from weathering, said outer side plates having a plurality of spaced apertures disposed therein,
   the inner side plates of said corner brace channels ascending from said channel bases for contacting at least a portion of the inner planar surfaces of said barge rafter and facia board and cooperating with said base and outer side plates to retain said barge rafter and facia board ends in an abutting right-angular relationship, and
   fastening means cooperating with said apertures in said outer side plates and penetrating said ends of the barge rafter and facia board for securely joining the corner brace channels to said ends of said barge rafter and facia board.

2. The corner brace as described in claim 1, wherein said fastening means comprises a plurality of nails.

3. The corner brace as described in claim 1, wherein said fastening means comprises a plurality of screws.

4. The corner brace as described in claim 1, wherein the width of said base of each of said channels is sized to snugly accommodate the width of said respective barge rafter and fascia board.

5. A corner brace for joining a barge rafter and a fascia board in building construction, comprising
   a pair of metal channels each having a base and a spaced parallel longer outer side plate and a shorter inner side plate ascending therefrom, said pair of channels abuttingly joined at one end and in open communication with each other in an opposing bi-planar relationship to form a right-angled corner brace, each one of said channels dimensioned to snugly receive the lower narrower side of one end of the barge rafter and fascia board between said outer and inner side plates, the base of each of said channels contacting said lower narrower side of one end of the barge rafter and fascia board and cooperating with said side plates for supporting the rafter and board in an opposed abutting rigid bi-planar right-angular relationship,
   the outer side plates of said corner brace ascending from said channel base for contacting and covering substantially all of the wider dimensioned outer planar surfaces of the barge rafter and fascia board disposed within said brace to protect the rafter and board surfaces from weathering, said outer side plates having a plurality of spaced apertures disposed therein,
   the inner side plates of said corner brace ascending from said channel bases for contacting at least a portion of the wider dimensioned inner planar surfaces of the barge rafter and fascia board disposed within said brace and cooperating with said base and outer side plates to retain the rafter and board ends in an opposed abutting bi-planar right-angular relationship, and
   fastening means cooperating with said apertures in said outer side plates and penetrating said ends of the barge rafter and fascia board for securely joining the corner brace channels to said ends of the barge rafter and fascia board.

6. The subcombination as described in claim 5, wherein said fastening means comprises a plurality of nails.

7. The subcombination as described in claim 5, wherein said fastening means comprises a plurality of screws.

* * * * *